(12) United States Patent
Ksionzyk et al.

(10) Patent No.: US 6,746,533 B2
(45) Date of Patent: Jun. 8, 2004

(54) QUICK DRYING PLASTER

(75) Inventors: Anne H. Ksionzyk, Decatur, GA (US); Hubert C. Francis, Lithonia, GA (US)

(73) Assignee: Georgia-Pacific Gypsum, Inc., Atlanta, GA (US)

( * ) Notice: Subject to any disclaimer, the term of this patent is extended or adjusted under 35 U.S.C. 154(b) by 0 days.

(21) Appl. No.: 10/158,225

(22) Filed: May 31, 2002

(65) Prior Publication Data

US 2003/0221591 A1 Dec. 4, 2003

(51) Int. Cl.$^7$ .......................... C04B 11/00; C04B 11/02
(52) U.S. Cl. ............... 106/772; 106/778; 524/4
(58) Field of Search ................ 106/772, 778; 524/4

(56) References Cited

U.S. PATENT DOCUMENTS

| | | |
|---|---|---|
| 3,015,626 A | 1/1962 | Kingsbury |
| 3,203,813 A | 8/1965 | Gajardo et al. |
| 3,793,042 A | 2/1974 | Jacobs et al. |
| 3,989,534 A | 11/1976 | Plunguian et al. |
| 4,000,241 A | 12/1976 | Dunn |
| 4,129,447 A * | 12/1978 | Roth et al. ................ 106/2 |
| 4,159,302 A | 6/1979 | Greve et al. |
| 4,161,855 A | 7/1979 | Mulvey et al. |
| 4,298,394 A * | 11/1981 | Leeming et al. ............ 106/781 |
| 4,336,068 A | 6/1982 | Vogel et al. |
| 4,351,867 A * | 9/1982 | Mulvey et al. ............... 428/70 |
| 4,518,652 A | 5/1985 | Willoughby |
| 4,911,759 A * | 3/1990 | Ohi et al. ................... 106/665 |
| 5,098,943 A * | 3/1992 | Tagawa et al. ............. 524/423 |
| 5,256,222 A | 10/1993 | Shepherd et al. |
| 5,294,256 A * | 3/1994 | Weigand et al. ............ 106/819 |
| 5,298,070 A * | 3/1994 | Cowan ....................... 106/724 |
| 5,340,392 A * | 8/1994 | Westbrook et al. ......... 106/471 |
| 5,505,771 A * | 4/1996 | Chihara et al. .............. 106/35 |
| 5,723,226 A | 3/1998 | Francis et al. |
| 6,171,388 B1 * | 1/2001 | Jobbins ....................... 106/778 |

* cited by examiner

*Primary Examiner*—Elizabeth D. Wood
(74) *Attorney, Agent, or Firm*—Banner & Witcoff, Ltd.

(57) ABSTRACT

A method for increasing the drying rate of set plaster by adding fatty alcohol sulfate to the slurry of calcium sulfate hemihydrate from which the plaster is made.

20 Claims, No Drawings

QUICK DRYING PLASTER

BACKGROUND

1. Field of the Invention

This invention relates to a quick-drying plaster. In particular, the invention relates to a method for increasing the drying rate of set plaster to form dry plaster. The invention also relates to a gypsum-containing mixture that, when combined with an appropriate quantity of water, forms set plaster that dries quickly to form dry plaster.

2. Description of Related Art

Gypsum products, such as wallboard, castings, and fireproofing, are formed by depositing an aqueous slurry of calcined gypsum on a substrate, such as paper for formation of wallboard, or in a mold or form. The calcined gypsum in the slurry becomes hydrated and is allowed to set, or harden. The hardened material then is dried, whether at ambient conditions or elevated temperature, until excess water is removed and dry plaster is obtained.

Quick and efficient production of dry plaster is desirable. Therefore, a plaster slurry that dries quickly is preferred. Quick drying saves time during manufacturing and reduces energy costs if heated drying is used. Overdrying, which can occur at the edges and thin parts of a product, typically reduces the strength of the dried product. Overdrying causes calcination of the gypsum dihydrate and reduces the strength of the product. Therefore, a product that dries quickly is less likely to give rise to a portion weakened by overdrying.

Typically, it is preferred that plaster be as light as possible, while maintaining strength and other desirable properties and characteristics. Use of plaster products having reduced density makes those products easier to work with and transport, for example.

One way of reducing the density of dry plaster is to introduce foam into the aqueous gypsum slurry from which the plaster is formed. Examples of such products are disclosed in U.S. Pat. Nos. 3,989,534, 4,518,652, and 6,171,388. Such products require use of film formers, such as guar gum, bentonite, polyvinyl alcohol, or latex polymers.

The rate at which set gypsum can be dried to form dry plaster is commercially important. Thus, it is desirable to achieve a rapid drying rate. Drying set gypsum at elevated temperature is effective in increasing drying rate as compared with drying at ambient temperature. Hence, kilns, ovens, and other devices are used to dry set gypsum to form plaster products. However, overdrying, which causes loss of strength, is more prevalent when heated drying is used. Thus, care must be taken to ensure that no portion of the set gypsum is overdried. The above-described prior art products exhibit standard drying rates and are susceptible to overdrying.

SUMMARY OF THE INVENTION

The invention is directed to a gypsum-containing mixture, to quick-drying plaster made therefrom, and to a method for increasing the drying rate of plaster. The plaster dries more quickly by including fatty alcohol sulfate in the slurry from which the plaster is made.

DETAILS OF THE INVENTION

The invention is directed to a method for increasing the drying rate of plaster and to the plaster thus made. Resulting plaster of the invention can be quickly and efficiently dried, yet retains desirable properties and characteristics, such as compressive strength and fire resistance. Plaster of the invention is particularly suited for forming castings and as fireproofing, such as is found in safes and fire-resistant containers. The invention also is directed to a gypsum-containing mixture which, when mixed with an appropriate quantity of water, forms an aqueous slurry that can be quickly dried to form dry plaster.

Skilled practitioners recognize that gypsum, calcium sulfate hemihydrate, which is sometimes called stucco, becomes hydrated in water to form an aqueous slurry of calcium sulfate dihydrate. The slurry hardens, or sets, to form a solid identified herein as set plaster. Any remaining excess water then is removed by drying, with or without heating, to form dry plaster.

The inventors have discovered that addition of fatty alcohol sulfate to gypsum slurry increases the drying rate of the plaster made from the slurry and yields plaster having desirable properties and characteristics. The alcohol sulfate forms foam when the mixture is hydrated during formation of the aqueous slurry of gypsum in water. Slurry containing alcohol sulfate has essentially the same flow characteristics upon hydration as gypsum alone. The resulting foam-containing slurry can be dried quickly to form dry plaster without destroying the hydrated gypsum crystal, thus retaining desired properties and characteristics of dry plaster. In particular, the fire resistance of the plaster is retained.

The inventors also have discovered that quick-drying plaster of the invention can be made lightweight, yet exhibit better compressive strength, and dry more quickly, than known foamed plaster, by adding polyvinyl alcohol to the slurry.

Addition of fatty alcohol sulfate to plaster in accordance with the method of the invention accelerates the drying rate of both foamed and unfoamed plasters. Although the inventors do not wish to be bound by theory, it is believed that addition of fatty alcohol sulfate causes plaster to dry more quickly because the alcohol moiety facilitates evaporation of water.

In accordance with the invention, the drying rate of plaster is increased by including alcohol sulfate in the slurry from which the plaster is made. For example, gypsum and alcohol sulfate can be combined with water to hydrate to gypsum and form an aqueous slurry, which may also contain other compounds. The slurry is hardened. In accordance with the invention, the hardened slurry dries quickly to form dry plaster without adversely affecting the gypsum crystal. The plaster may be made lightweight by including polyvinyl alcohol in the slurry.

Both naturally-occurring and synthetic forms of gypsum are suitable for use in the invention. Gypsum, or calcium sulfate hemihydrate, is available commercially under many names including inter alia molding plaster, statuary plaster, plaster, plaster of paris, and gypsum stucco. Either $\alpha$-plaster or $\beta$-plaster may be used in the method of the invention. Skilled practitioners recognize that "synthetic" gypsum is recovered from certain flue gas desulfurization operations and differs from naturally-occurring gypsum because it has a different, typically round, particle shape.

Skilled practitioners recognize that divers materials may be present in dry gypsum or in the aqueous slurry. Molding plaster contains a small quantity of calcium chloride; for example. Additives include colorants; dispersants such as Lomar D (naphthalene sulfonate, available from GEG Specialty Chemical) (for control of fluidity); vermiculite (for fire resistance); defoamers such as Foamaster PD#1, available from GEG Specialty Chemical (to control foam in the slurry); foaming agents such as polyvinyl alcohol (to foam the slurry); retarders, such as sodium citrate; and the like. Such materials may be added to the aqueous slurry or to the mixture of the invention in quantities that do not adversely affect the basic nature of the invention. Skilled practitioners recognize that some types, such as molding plaster and α-plaster, will dry more quickly than other types, because the initial water demand is lower.

Alcohol sulfate suitable for use in the mixture of the invention has an alkyl moiety having between about 8 and about 20 carbon atoms. Preferably, the alcohol sulfate has an alkyl moiety of between about 10 and about 16 carbon atoms. Such alcohol sulfate is commercially available. One product line of suitable alcohol sulfates is available from Witco under the trade names Supralate® and Dupanol®. These products are fatty alcohol sulfates, typically combined with sodium as the balancing ionic moiety.

Suitable alcohol sulfates (and the trade name under which they are available from Witco) include sodium lauryl sulfate (Supralate® M E dry, a dry product), also known as sodium dodecyl sulfate; sodium tetradecyl sulfate (Dupanol® WA Q E); sodium octyl/decyl sulfate (Supralate® W N); sodium octyl sulfate (Supralate® S P); and diethanolamine lauryl sulfate (Supralate® E P). Sodium lauryl sulfate formerly was available from duPont under the tradename Dupanol®. The products comprising sodium as the balancing ion are preferred; sodium lauryl sulfate, particularly Supralate® M E, is more preferred.

Skilled practitioners recognize that the fatty alcohol sulfates described herein are solids. Thus, it is anticipated that the mixture of the invention will be a dry mixture, and alcohol sulfate will be introduced into the slurry in this way. Dry mixtures are particularly advantageous, as they can be easily transported and stored. However, fatty alcohol sulfates are available in liquid form, whether alone or as, for example, an aqueous solution or suspension. Such liquid products are not suitably incorporated into dry mixtures. However, skilled practitioners recognize that the mixture of the invention can be formed with such liquid phase alcohol sulfate by combining gypsum with the alcohol sulfate and water to form a slurry. Introduction of the alcohol sulfate directly into the slurry is within the scope of the claimed invention.

The quantity of alcohol sulfate added is between about 0.005 and about 0.2 weight %, based on the weight of the gypsum; and preferably between about 0.008 and about 0.15 weight %; and more preferably between about 0.01 and 0.10 weight %. Lesser quantities can be used, but are not likely to provide the quick drying and crystal protection desired. Greater quantities may introduce undesirable foaming and not yield a cost effective marginal drying rate increase. With the guidance provided herein, skilled practitioners will be able to select an appropriate quantity of alcohol sulfate.

Skilled practitioners recognize that the fatty alcohol sulfates described herein are solids. Thus, it is anticipated that the mixture of the invention will be a dry mixture, and alcohol sulfate will be introduced into the slurry in this way. Dry mixtures are particularly advantageous, as they can be easily transported and stored. However, fatty alcohol sulfates are available in liquid form, whether alone or as, for example, an aqueous solution or suspension. Such liquid products are not suitably incorporated to dry mixtures. However, skilled practitioners recognize that the mixture of the invention can be formed with such liquid phase alcohol sulfate by combining gypsum with the alcohol sulfate and water to form a slurry. Introduction of the alcohol sulfate directly into the slurry is within the scope of the claimed invention.

Slurry made by combining mixture of the invention with water in quantity sufficient to hydrate the gypsum and provide a workable slurry has flow characteristics, such as pouring consistency, comparable to those of gypsum slurry alone. Skilled practitioners recognize that there exist a number of tests for determining the flow characteristics of gypsum slurry. For example, one can use a consistometer, a device known to practitioners. One also can determine pouring consistency by a free pour of gypsum slurry onto a smooth inert surface such as glass from a height of, e.g., about 1–4 inches, preferably about 2 inches. It is convenient to determine the weight of water necessary per weight of the gypsum to yield a pat of predetermined diameter.

Any suitable method can be used to determine pouring consistency. For example, one can determine the pat diameter obtained when gypsum is hydrated with a given quantity of water. Comparison of such diameters for divers gypsum sources will provide a relative measure of fluidity for the sources.

Dry plaster of the invention is made by drying set gypsum to remove excess water. The set product can be dried under ambient conditions or by heating in a kiln, oven, or other suitable device known to skilled practitioners. Typically, drying temperatures between about 125 and about 225° F. are utilized for a time sufficient to achieve the desired degree of dryness at the drying temperature selected. For example, drying set plaster to a pre-selected moisture level may take about 225 minutes at 150° F., but only 60 minutes at 200° F. With the guidance provided herein, a skilled practitioner will be able to select suitable drying conditions.

Plaster of the invention can be dried in any manner known to skilled practitioners. Plaster of the invention will dry more quickly at a given temperature than known plasters without suffering adverse effects of overdrying at the edges and thin portions. As skilled practitioners recognize, overdrying causes disruption of the dihydrate gypsum crystal and dehydration thereof to calcium sulfate hemihydrate, which has a very low compressive strength.

The inventors also have discovered that including polyvinyl alcohol in the slurry can form particularly lightweight plaster. The polyvinyl alcohol foams the plaster sufficiently to reduce the density thereof However, in combination with the fatty alcohol sulfate, the resultant product dries quickly and has particularly high compressive strength. In accordance with the invention, the compressive strength is about 25% higher than plaster foamed to the same density by known methods, preferably about 40% higher, and more preferably about 50% higher.

Polyvinyl alcohol having any degree of hydrolysis, typically at least about 75%, is suitably used in the invention. Polyvinyl alcohol is available as aqueous solutions in varying concentrations and as solid. As set forth above, solid polyvinyl alcohol can be added to a dry mix to form a dry mixture, and liquid polyvinyl alcohol solution can be introduced as part of formation of the slurry.

Skilled practitioners recognize that polyvinyl alcohol having a degree of hydrolysis less than about 88% is freely soluble in water at about 150° F. However, the solubility of polyvinyl alcohol decreases with increasing degree of hydrolysis, so higher temperatures are required for complete dissolution. Thus, a degree of hydrolysis of less than about 88% is preferred.

The following examples illustrate the invention.

EXAMPLES

Comparative Example 1

Four types of gypsum-containing products were used to prepare comparative examples, as follows:

Gypsum A—molding plaster (Georgia-Pacific Gypsum)

Gypsum B—continuous stucco (Georgia-Pacific Gypsum)

Gypsum C—plaster containing vermiculite (fire-resistant-available from Georgia-Pacific Gypsum)

Gypsum D—synthetic stucco (Wheatfield)

The pouring consistency (PC) of Gypsum C with 0.1% Lomar D dispersant was determined at 56 grams of water per 100 grams of gypsum, and sufficient dispersant was added to Gypsums A (0.2%), B (0.4%), and D (0.3%) to match the PC of Gypsum C. Gypsum D was prepared with and without sodium citrate retarder.

The gypsum was fully hydrated, and two-inch cubes of each plaster were weighed before being put into an oven maintained at 150° F. The weight of each cube was determined periodically for 225 minutes. Gypsum D, without retarder, dried most quickly and completely, as can be seen in the following Table 1.

TABLE 1

| Drying Time, minutes | Gypsum | | | | |
|---|---|---|---|---|---|
| | A | B | C | D | D/retarder |
| | Wt Percent Lost | | | | |
| 0 | 0 | 0 | 0 | 0 | 0 |
| 30 | 3.4 | 3.2 | 3.4 | 4.2 | 3.4 |
| 60 | 6.6 | 6.2 | 6.6 | 8.0 | 6.4 |
| 90 | 9.9 | 9.4 | 10.1 | 11.6 | 10.0 |
| 120 | 13.6 | 12.5 | 14.2 | 14.9 | 13.5 |
| 150 | 17.9 | 15.4 | 17.9 | 18.7 | 15.4 |
| 180 | 19.6 | 18.2 | 19.6 | 20.1 | 18.2 |
| 195 | 20.5 | 19.2 | 20.8 | 21.6 | 19.0 |
| 210 | 21.5 | 20.1 | 21.6 | 22.3 | 19.9 |
| 225 | 22.3 | 21.0 | 22.5 | 23.0 | 20.5 |

Plural samples of two-inch cubes, fully hydrated, also were similarly heated at 200° F., again with Gypsum D drying most quickly through 105 minutes, as reflected in the average of the plural weight loss determinations set forth in the following Table 2.

TABLE 2

| Drying Time, minutes | Gypsum | | | |
|---|---|---|---|---|
| | A | B | C | D |
| | Wt Percent Lost | | | |
| 0 | 0 | 0 | 0 | 0 |
| 30 | 4.5 | 5.3 | 5.1 | 5.7 |
| 60 | 10.1 | 10.2 | 11.0 | 11.3 |
| 90 | 15.0 | 14.9 | 15.5 | 15.9 |
| 105 | 17.4 | 17.4 | 18.0 | 18.1 |
| 120 | 19.5 | 19.5 | 20.1 | 19.5 |
| 135 | 20.8 | 20.8 | 21.7 | 20.8 |
| 150 | 22.3 | 21.7 | 22.8 | 21.7 |
| 165 | 23.0 | 23.0 | 24.0 | 22.4 |
| 180 | 23.3 | 23.4 | 24.5 | 23.4 |
| 195 | 24.0 | 24.0 | 24.9 | 23.8 |

Note that the drying rate decreased after about 180 minutes for the samples dried at 150° F., and after about 105 minutes for the samples dried at 200° F., showing evidence of a reduction in the amount of free moisture remaining in the sample.

Comparative Example 2

Gypsum (U.S. Gypsum), identified herein as 'E', was prepared by hydrating 100 grams of gypsum with 56 grams of water.

One-inch cubes of A, C, D, and E were dried at 200° F.

TABLE 3

| Drying Time, minutes | Gypsum | | | |
|---|---|---|---|---|
| | A | C | D | E |
| | Wt Percent Lost | | | |
| 0 | 0 | 0 | 0 | 0 |
| 15 | 7.2 | 8.1 | 8.1 | 8.1 |
| 30 | 15.0 | 15.0 | 15.3 | 14.0 |
| 45 | 19.0 | 19.9 | 19.0 | 18.0 |
| 60 | 22.5 | 23.7 | 22.5 | 20.9 |
| 75 | 23.9 | 24.9 | 23.9 | 22.3 |
| 90 | 24.0 | 25.0 | 24.0 | 23.0 |
| 105 | 24.1 | 25.1 | 24.1 | 23.2 |

The porosity was determined by a displacement method. The specific surface area was determined by Laser Diffraction Analysis. Both are reported in Table 4 below. As can be seen, the lower the specific surface area, the quicker the drying time even though the porosity of the quickest drying gypsum was lowest of all gypsums. Because of the vermiculite in gypsum C, the relationship between specific surface area and porosity is not the same as it is for the other gypsums.

TABLE 4

| Gypsum | Porosity, % | Specific Surface Area, $cm^2/cm^3$ |
|---|---|---|
| A | 28.8 | 7004 |
| C | 25.9 | 5103 |
| D | 24.9 | 7390 |
| E | 22.6 | 3255 |

Example 3

Molding plaster (3A–3F) and synthetic gypsum (USG), (3G), were prepared with 56 grams of water per 100 grams of gypsum, as follows:

| | Gypsum | | | | | |
|---|---|---|---|---|---|---|
| | 3A | 3B | 3C | 3D | 3E | 3F |
| Dupanol, wt % | 0.009 | 0.0125 | 0.0125 | 0.025 | 0.05 | 0.10 |
| Foamaster PD#1, wt. % | | | 0.05 | | | |
| Lomar D, wt. % | 0.05 | | | | 0.2 | 0.2 |

One inch cubes of each set plaster were dried at 200° F. Weight loss as a function of time is set forth in Table 5 below

TABLE 5

| Drying Time, min | Gypsum | | | | | | |
|---|---|---|---|---|---|---|---|
| | 3A | 3B | 3C | 3D | 3E | 3F | 3G |
| | Wt Percent Lost | | | | | | |
| 0 | 0 | 0 | 0 | 0 | 0 | 0 | 0 |
| 15 | 8.4 | 6.8 | 7.6 | 6.8 | 7.6 | 8.8 | 6.8 |
| 30 | 15.6 | 13.0 | 14.3 | 14.3 | 14.7 | 16.7 | 14.7 |

TABLE 5-continued

|  | Gypsum | | | | | | |
|---|---|---|---|---|---|---|---|
| Drying Time, min | 3A | 3B | 3C | 3D | 3E | 3F | 3G |
|  | | | | Wt Percent Lost | | | |
| 45 | 21.4 | 19.7 | 19.7 | 19.7 | 19.7 | 20.7 | 19.7 |
| 60 | 22.8 | 22.1 | 22.2 | 22.2 | 22.2 | 22.2 | 22.2 |
| 75 | 23.9 | 23.3 | 23.3 | 23.3 | 23.3 | 23.3 | 23.3 |
| 90 | 24.0 | 23.8 | 23.8 | 23.8 | 23.8 | 23.8 | 23.8 |
| 105 | 24.2 | 24.0 | 24.0 | 24.0 | 24.0 | 24.0 | 24.0 |

As can be seen from this data, use of the method of the invention increased the drying rate of both molding plaster and synthetic gypsum.

Example 4

Two-inch cubes of statuary plaster available from Georgia-Pacific Gypsum were prepared using 62 grams of water per 100 grams of plaster, as set forth in the following Table 6, in which the quantities are given in weight units:

TABLE 6

|  | Gypsum | | |
|---|---|---|---|
|  | Comparative | 4A | 4B |
| Gypsum | 100 | 100 | 100 |
| Polyvinyl alcohol |  | 0.625 | 0.625 |
| Sodium lauryl sulfate (Dupanol) ® |  | 0.05 | 0.025 |

As is apparent to skilled practitioners, the Comparative gypsum is not a foamed product.

The polyvinyl alcohol had a degree of hydrolysis of 88% and was added as solid to the plaster.

The compressive strength of the cubes was determined by a Riehle compressive strength apparatus. As can be seen from the following Table 7, which also includes a typical value for foamed plaster at density approximately equal to the density of Gypsums 4A and 4B, illustrates the superior compressive strength of lightweight, quick-drying foamed plaster of the invention.

TABLE 7

|  | Gypsum | | | |
|---|---|---|---|---|
|  | Est'd. Foamed Comparative | Comparative | 4A | 4B |
| Density, lb/ft$^3$ | 47 | 75 | 44 | 50 |
| Comp. Strength, psi | 450 | 2810 | 695 | 905 |

These examples of the invention illustrate the superior compressive strength of foamed products of the invention.

The examples should be considered as illustrative of the invention, and not limiting in any way. For example, different pouring consistencies, gypsum sources, and fatty alcohol sulfate sources could be utilized in the invention, in accordance with the description of the invention in the specification.

We claim:

1. A method for increasing the drying rate of set plaster to form fireproofing material consisting essentially of hydrated calcium sulfate hemihydrate, said method consisting essentially of adding to a slurry consisting essentially of calcium sulfate hemihydrate as the solid material a drying accelerant consisting essentially of fatty alcohol sulfate in an amount between about 0.005 and 0.2 wt %, based on the weight of the calcium sulfate hemihydrate in the slurry, and then drying the set plaster.

2. The method of claim 1 wherein the plaster is made from calcium sulfate hemihydrate selected from the group consisting of molding plaster, statuary plaster, plaster, gypsum, plaster of paris, stucco, and blends thereof.

3. The method of claim 1 wherein the fatty alcohol sulfate is selected from the group of fatty alcohol sulfates having an alkyl moiety of between about 8 and about 20 carbon atoms.

4. The method of claim 3 wherein the fatty alcohol sulfate is selected from the group consisting of fatty alcohol sulfates having an alkyl moiety of between about 10 and about 16 carbon atoms.

5. The method of claim 4 wherein the fatty alcohol sulfate is sodium lauryl sulfate.

6. The method of claim 1 wherein the fatty alcohol sulfate is present in a quanity of between about 0.008 and about 0.15 weight %, based on the weight of the calcium sulfate hemihydrate.

7. The method of claim 6 wherein the fatty alcohol sulfate is present in a quantity of between about 0.01 and about 0.10 weight %, based on the weight of the calcium sulfate hemihydrate.

8. A method for increasing the drying rate and decreasing the density of set plaster to form casting material that, when dried, has compressive strength superior to that of conventionally-dried plaster products having comparable density, said method consisting essentially of adding to a slurry consisting essentially of calcium sulfate hemihydrate as the solid material polyvinyl alcohol and a drying accelerant consisting essentially of fatty alcohol sulfate in an amount between about 0.005 and 0.2 wt %, based on the weight of the calcium sulfate hemihydrate in the slurry, and then drying the set plaster.

9. The method of claim 8 wherein the plaster is made from calcium sulfate hemihydrate selected from the group consisting of molding plaster, statuary plaster, plaster, gypsum, plaster of paris, stucco, and blends thereof.

10. The method of claim 8 wherein the fatty alcohol sulfate is selected from the group of fatty alcohol sulfates having an alkyl moiety of between about 8 and about 20 carbon atoms.

11. The method of claim 10 wherein the fatty alcohol sulfate is selected from the group consisting of fatty alcohol sulfates having an alkyl moiety of between about 10 and about 16 carbon atoms.

12. The method of claim 11 wherein the fatty alcohol sulfate is sodium lauryl sulfate.

13. The method of claim 8 wherein the fatty alcohol sulfate is present in a quantity of between about 0.008 and about 0.15 weight %, based on the weight of the calcium sulfate hemihydrate.

14. The method of claim 13 wherein the fatty alcohol sulfate is present in a quantity of between about 0.01 and about 0.10 weight %, based on the weight of the calcium sulfate hemihydrate.

15. A mixture for forming fireproofing material, said mixture consisting essentially of gypsum and between about 0.005 and about 0.2 wt %, based on the weight of the gypsum, of fatty alcohol sulfate.

16. A mixture for forming casting material having compressive strength superior to castings of comparable density, consisting essentially of gypsum, polyvinyl alcohol, and a drying agent consisting essentially of fatty alcohol sulfate in a quantity of between about 0.005 and 0.2 wt %, based on the weight of the gypsum.

17. The mixture of claim 15 wherein the mixture is a dry mixture.

18. The mixture of claim 16 wherein the mixture is a dry mixture.

19. Dry fireproofing material made in accordance with the method of claim 1.

20. Dry casting material made in accordance with the method of claim 8.

* * * * *

UNITED STATES PATENT AND TRADEMARK OFFICE
CERTIFICATE OF CORRECTION

PATENT NO. : 6,746,533 B2
DATED : June 8, 2004
INVENTOR(S) : Anne H. Ksionzyk et al It is certified that error appears in the above-identified patent and that said Letters Patent is hereby corrected as shown below:

Column 2,
Line 65, please replace "GEG" with -- GEO --.

Column 3,
Line 1, please replace "GEG" with -- GEO --.
Lines 30-44, please replace the existing paragraph with the following:
-- Skilled practitioners recognize that, while these products are identified by a single alkyl moiety, they typically contain not only this moiety, but also other alkyl moieties. For example, although the Supralate® M E product is identified as comprising a dodecyl ($C_{12}$) moiety, the M S D S (Material Safety Data Sheet) for this product describes it as comprising $C_{12}$-$C_{16}$ moieties. Further, these products also can be expected to comprise analogous alcohols from which they are made and unreacted source of balancing ion and of sulfate. However, these other components, when present in amounts typically found in the commercially available products, do not adversely affect the method, the mixture, or the plaster of the invention. --
Line 64, please replace "to" with -- into --.

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,746,533 B2
DATED : June 8, 2004
INVENTOR(S) : Anne H. Ksionzyk et al.

It is certified that error appears in the above-identified patent and that said Letters Patent is hereby corrected as shown below:

Title page,
Item [73], Assignee, please replace "Georiga-Pacific Gypsum, Inc." with -- G-P Gypsum Corporation --.

Signed and Sealed this

Twenty-fifth Day of October, 2005

JON W. DUDAS
*Director of the United States Patent and Trademark Office*